Aug. 17, 1965 M. L. STINSON 3,200,938
ROPE ANCHOR STRUCTURE
Filed Sept. 24, 1962 2 Sheets-Sheet 1
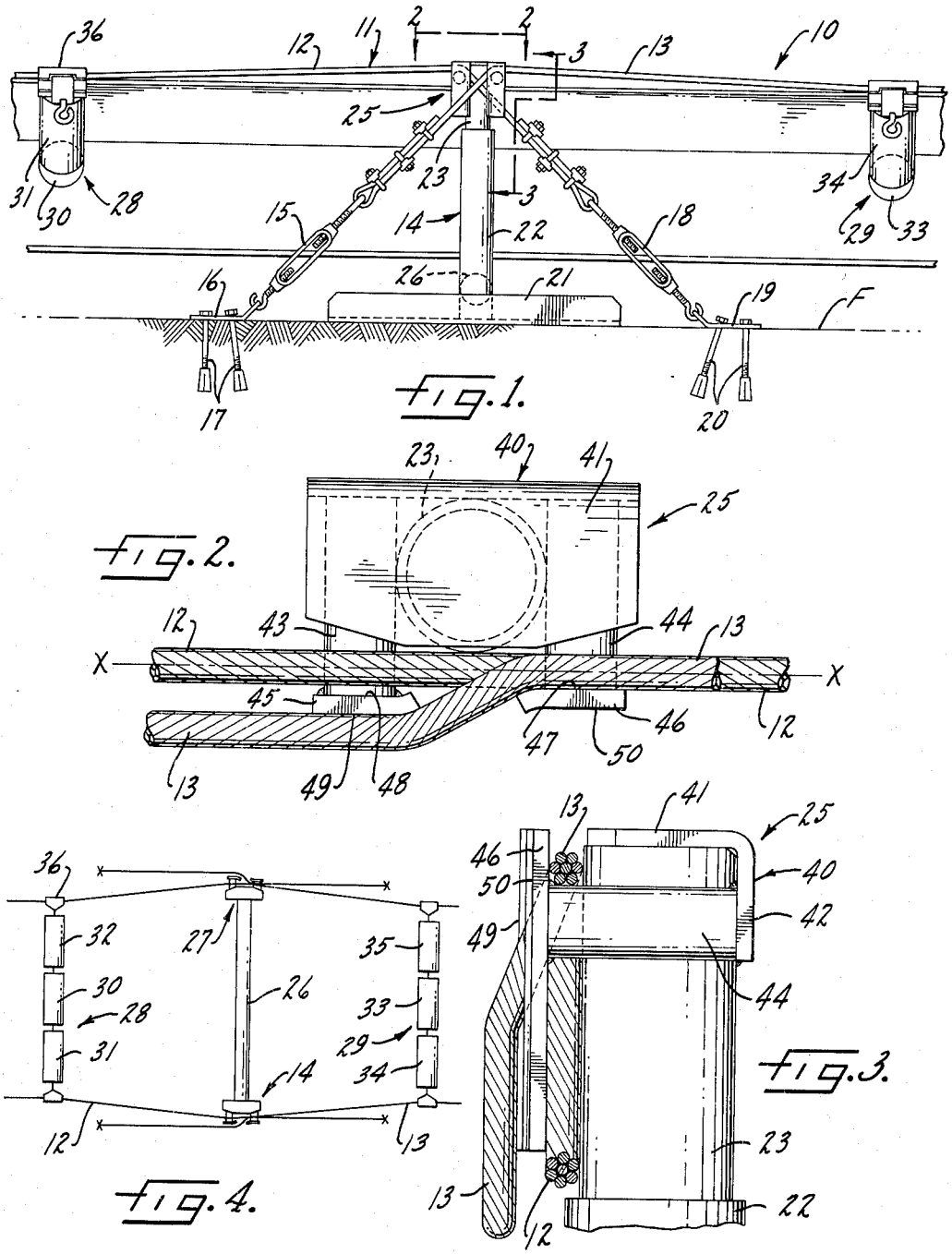
INVENTOR.
Mary L. Stinson,
BY Parker & Carter
Attorneys.

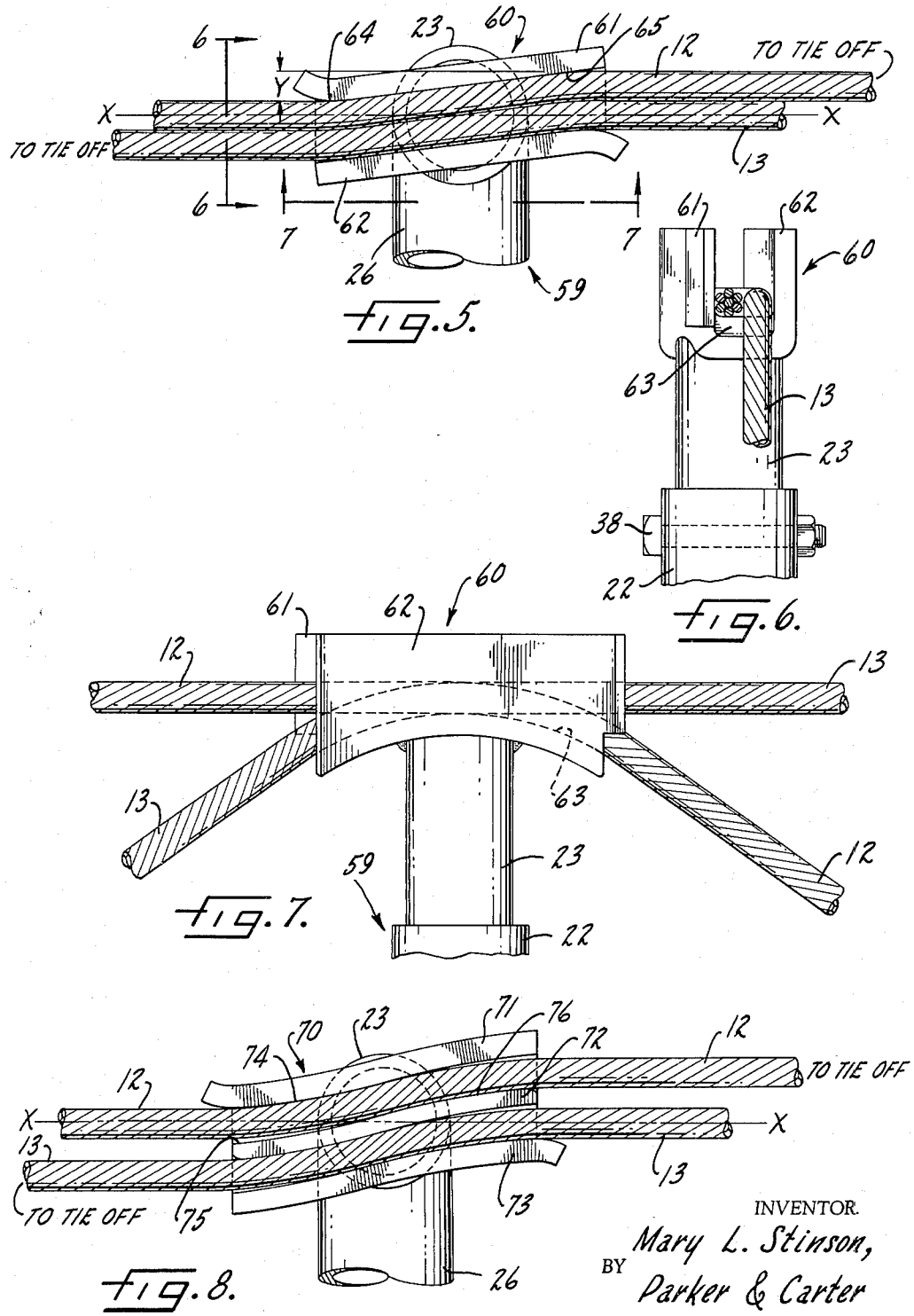

United States Patent Office 3,200,938
Patented Aug. 17, 1965

3,200,938
ROPE ANCHOR STRUCTURE
Mary L. Stinson, Chicago, Ill., assignor to Goodman Manufacturing Company, Chicago, Ill., a corporation of Illinois
Filed Sept. 24, 1962, Ser. No. 225,577
9 Claims. (Cl. 198—192)

This invention relates to means for maintaining tensioned strands in alignment with one another, and particularly to structure for maintaining meeting wire rope sideframes forming one side of a wire rope sideframe belt conveyor in exact, axial alignment with one another at their point of coincidence.

Wire rope sideframes have recently come into widespread use due to their many inherent desirable features including simplicity of installation and operation, high carrying capacity, and extreme ruggedness due to their ability to absorb impact loads. Such conveyors generally comprise a pair of tensioned wire rope sideframes which extend parallel to one another from the head section to the tail section of the conveyor. The sideframes are supported at generally regular intervals by support structure, usually ground engaging support stands, although other means such as roof suspension arrangements may be utilized.

A plurality of troughing idler assemblies are suspended from the rope sideframes between adjacent support stands. These troughing idler assemblies form a bed upon which rests the conveying reach of a flexible conveyor belt. Return roller assemblies, which may be supported from any suitable structure such as the wire rope sideframes or the support stands or the ground, support the return reach of the belt which underlies the conveying reach. Motive power is imparted to the belt by drive pulleys at either the head section or tail section. An example of such a conveyor is illustrated in Craggs et al. Patent No. 2,773,257 to which reference is made for the general environment and background of this invention.

Maintaining a moving conveyor belt properly centered on the troughing idler assemblies is desirable if the optimum carrying capacity and most efficient, economical operation of the conveyor is to be attained. Many factors effect the maintenance of the conveying reach in a centered or "in train" position. Among these are the relative positions of the troughing idler assemblies with respect to one another and to the wire rope sideframes, the tension in the rope sideframes, and the spacing of the troughing idler assemblies from the support structure.

With respect to spacing, it has been found that the troughing idler assemblies which flank a support stand should be equally spaced from the support stand. This is because, assuming the troughing idler assemblies are perpendicular to the axis of the conveyor and the flexible strand tensions are equal, the sag of each troughing idler assembly would be identical so that corresponding rollers in sequential idler assemblies will lie in the same plane. For example, if each troughing idler in a pair of troughing idlers is located five feet from a support stand, one on either side, the downward sag of the rope sideframes will be equal. Since the troughing idlers are of identical lengths, the center rollers of all troughing idler assemblies will lie in the same plane from support stand to support stand.

It not infrequently happens however that a single flexible sideframe does not extend the complete length of the conveyor. Frequently, for example, the conveyor must be extended. Rather than remove each troughing idler assembly from the sideframes, install a new wire rope, and re-install each idler assembly, a new length is merely tacked on the head or tail end of the conveyor as required. When this happens, and even assuming equal rope tension and proper placement of the troughing idler assemblies with respect to the stands, adverse belt training effects may result due to the misalignment of the meeting wire rope sideframes at their point of intersection. That is, if the rope sideframes are merely laid alongside one another, one of them will be offset the thickness of the wire rope from the longitudinal or reference axis of the other strand. Even though the gauge of the wire ropes, that is the distance from center to center of the ropes, may be maintained constant on either side of the support stands, the wire ropes on either side of the stand will not coincide. In effect, the wire ropes are shifted, or offset from one another at the point of intersection.

This shifting or offsetting of the wire ropes may be sufficient to impart detraining tendencies to the conveyor belt. If the ropes in one set of ropes to one side of a support stand are placed on the outside edges of the meeting set of ropes, the gauge will be lengthened and the troughing idler assembly carried by the first set of ropes will ride higher than the troughing idler assembly carried by the other set of ropes. If the conveyor belt is then trained while loaded, the belt may detrain when the load is removed because the belt, due to its tension, only makes contact with the higher of the two center rollers. Similarly, if, in such an arrangement, the belt is trained when unloaded, it may have a tendency to detrain when loaded.

In short then it is highly desirable that the rope gauges be maintained constant from end to end of the conveyor, and that meeting wire rope sideframes coincide with a basic reference axis extending the length of the conveyor in order that the individual, corresponding rollers from troughing idler assembly to troughing idler assembly lie in the same plane.

Accordingly, a primary object of this invention is to provide means for imparting uniform belt training characteristics to both a loaded and an unloaded conveyor belt.

Another object is to improve belt training by maintaining a constant rope gauge from troughing idler assembly to troughing idler assembly, especially at idler positions flanking tie off points, i.e., rope anchors, and thereby a uniform vertical elevation of the center or primary training rollers in the troughing idler assemblies.

Yet a further object is to provide a rope anchor stand which serves the dual function of maintaining a constant rope gauge and providing an easy rope tie off location.

Yet another object is to provide an anchor point structure which can be secured to a standard, or specially designed, rope support stand, or any other desired supporting structure.

Other objects and advantages will become apparent upon a reading of the following description of the invention.

The invention is illustrated more or less diagrammatically in the accompanying figures wherein:

FIGURE 1 is a side view of an anchor point in a wire rope sideframe flexible belt conveyor;

FIGURE 2 is a plan view taken substantially along the line 2—2 of FIGURE 1;

FIGURE 3 is a sectional view taken substantially along the line 3—3 of FIGURE 1;

FIGURE 4 is a diagrammatic top plan view of the portion of the conveyor shown in FIGURE 1 to a reduced scale;

FIGURE 5 is a top plan view of another embodiment of the invention;

FIGURE 6 is a partial, sectional view taken substantially along the line 6—6 of FIGURE 5;

FIGURE 7 is a partial, side view taken substantially along the line 7—7 of FIGURE 5; and FIGURE 8 is a top plan of another embodiment of the invention.

Like reference numerals will be used to refer to like parts throughout the following description of the drawings.

A wire rope sideframe flexible belt conveyor is indicated generally at 10 in FIGURE 1. The conveyor rests on the floor F of an underground coal mine for example. A wire rope sideframe is indicated generally at 11. Functionally the sideframe is a single wire rope extending from end to end of the conveyor. Actually it is composed of two separate wire ropes 12 and 13. The ropes are supported by a support stand indicated generally at 14 which rests upon the floor F. The extreme end of rope 13 is bent back upon itself, and secured to itself, and passes through the eye of a turn buckle 15 which in turn is hooked to a floor plate 16 secured to floor F by a plurality of bolts 17. The extreme end of rope 12 is bent back upon itself, and secured to itself, and passes through the eye bolt of another turn buckle 18 which is hooked to floor plate 19 secured to the floor by a plurality of bolts 20. The turn buckles 15 and 18 may be rotated to slack off or increase the tension in each rope.

Support stand 14 consists essentially of a base 21 and an upstanding tubular post 22. The post may have an upper telescoping section 23 and any suitable means such as bolt 38, see FIGURE 6, may be used to vary the length of the post. Structure for maintaining the rope gauge constant on either side of the support stand 14, and for insuring coincidence of the axis of ropes 12 and 13 at the support stands is indicated at 25. In this instance, the support stand 14 is secured by a tubular cross bar 26 to a similar support stand 27 on the opposite side of the conveyor. Since the support stands 14 and 27 are identical, a description of one will suffice for a description of both.

Troughing idler assemblies are indicated at 28 and 29. Idler assembly 28 consists of a center roller 30 flanked by a pair of wing rollers 31, 32 and idler 29 consists of a center roller 33 flanked by a pair of wing rollers 34 and 35. The assemblies are secured to the ropes at equal distances from the support stands 14, 27 by suitable rope clamps 36, the details of which are not pertinent to the invention.

The support structure 25 consists essentially of a plate 40 which is bent at right angles to form a top flange 41 overlying the upper end of tubular member 23, and a downwardly extending side or back flange 42. Plate 40 extends outwardly a substantial distance from either side of tubular member 23 as best seen in FIGURE 2. A pair of stub shafts or tubes 43, 44 are welded to the inner surface of the back flange 42. These stub members, or shoes, are parallel to one another and their upper surfaces are co-planar. Further, when the support stand is placed on the level, the upper bearing surfaces of the shoes 43, 44 lie in a plane parallel to the level plane of support.

A pair of vertical guide members 45, 46 are welded or otherwise suitably secured to the outer ends of sleeves 43, 44 respectively. Shoe 43 is slightly longer than shoe 44 so that the inner surface 47 of vertical guide 46 is located closer to the back flange 42 than is the inner surface 48 of vertical guide 45. Similarly the outer vertical surface 49 of guide 45 lies outwardly a substantially greater distance from back flange 42 than does the surface 50 of guide 46.

The right edge of vertical guide 45 is curved slightly inwardly toward back flange 42, and the left edge of vertical guide 46 is curved slightly outwardly away from back flange 42 as best seen in FIGURE 2.

From a comparison of FIGURES 1, 2 and 3, it will be observed that rope 13 passes over the upper bearing surface of shoe 44, bears against the inner vertical bearing surface 47 of guide 46, and then bends around the curved edges of the vertical guides so as to bear against the outer surface 49 of vertical guide 45. At the same time the extremity of rope 13 extends downwardly to turn buckle 15.

Wire rope 12 passes over and bears against the upper surface of shoe 43 and then bends downwardly beneath shoe 44. The rope may bear against the inner surface 47 of guide 46 as seen in FIGURE 3, but this is not essential.

It will thus be noticed that the effective portion of rope 13, that is that portion of it to the right of shoe 44, and the effective portion of rope 12, that is that portion of it to the left of shoe 43, coincide with reference axis X. They therefore are in axial alignment with one another.

In the embodiment shown in FIGURES 5 and 6 the anchor point structure is indicated at 60. In this instance the structure consists essentially of a pair of elongated vertical guides 61, 62 which flank a curved bearing surface 63, the curved contour of which is best seen in FIGURE 7. The vertical guides are slightly inclined with respect to the reference axis X. Specifically, the angle of inclination is such that the deviation of each guide from a line parallel to the reference axis is equal to the width of a rope between the extreme points of contact with the rope. That is, if 64 is the extreme left point of contact between the inner face of vertical guide 61 and rope 12, and 65 is the extreme right point of contact between the inner surface of vertical guide 61 and rope 12, the distance Y (which represents the offset with respect to the reference axis X), is equal to the dimension of each rope. The same relationship holds true with respect to the offset, i.e., the angle of inclination of vertical guide 62 with respect to the reference axis X.

From a study of FIGURE 5 it will at once be apparent that each of the ropes has been angularly displaced in a direction transverse to the longitudinal axis of the conveyor, the total displacement being such that the effective or gauge determining portion of rope 13, which lies to the right of stand 14, and the effective or gauge determining portion of rope 12, which lies to the left of stand 14, coincide with one another and with the reference axis X.

In the embodiment of FIGURE 8, the support structure 70 comprises three vertical guide members 71, 72, 73 and in this instance the transverse displacement of each wire rope, or in other words the angle of inclination of each vertical guide, is substantially greater than the corresponding angle of inclination in the FIGURE 5 embodiment. In effect, each wire rope must make a sharper bend to compensate for the added width of center guide 72. One added advantage of this arrangement is that each rope makes contact with flanking vertical guides at only two locations, as contrasted to the FIGURE 5 arrangement in which each wire rope contacts its associated vertical guide, and the other wire rope throughout substantially the entire length of overlap. Thus in FIGURE 8 wire rope 12 contacts the inner surface of vertical guide 71 in the area indicated at 74. It also contacts the opposed, facing surface 75 of vertical guide 72 in area 76. Wire rope 13 similarly makes contact with a small area near the left end of vertical guide 72, and with an area near the right end of vertical guides 73.

The use and operation of the invention is as follows:

In order to maintain the rope gauge constant along the length of the flexible belt conveyor, and further to maintain sequential sections of each wire rope sideframe in axial alignment with flanking sections, the special wire rope support anchor of either FIGURES 1, 5 or 8 is utilized.

In the FIGURE 1 embodiment, wire rope 12 is passed over the upper bearing surface of shoe 43 and thence downwardly to its ground connecting structure 18. Similarly, wire rope 13 is passed over shoe 44, then outwardly following the contour of the outturned lip of vertical guide 46, and thence inwardly following the contour of the outer surface of vertical guide 45, and downwardly to its tie off structure 15. The bend point of each rope at its associated shoe is the point of departure of the end portion of each rope from the reference axis X. The points of departure are of course coincident with the reference axis.

Since the anchor strucnture 25 is such that the end portions of the meeting ropes do not intercept one another, it is immaterial which rope is threaded into place first. Similarly, if one rope, for example rope 12, is already positioned, it is not necessary to slack it off in order to install rope 13. Rope 13 may merely be threaded around rope 12 and it is therefore only necessary to cut the belt, rather than cut the belt and slack off the narrow wire rope 12, in order to add a new conveyor section to the right of support stand 14.

In the FIGURE 5 embodiment, either one of ropes 12 or 13 may be laid in place first, and similarly connected to ground tie off structure equivalent to turn buckles 15, 18. If a conveyor section is to be added to the right of support stand 59, care should be taken to install rope 12 in its illustrated position. Thereafter, when it is decided to add another section to the conveyor to the right of stand 59, rope 13 is merely placed in the depression formed between inner vertical guide 62 and rope 12. Since both ropes lie in the same plane, or in the same curved surface if the bearing surface 63 is curved, both ropes 12 and 13 will be at the same elevation.

Installation of the FIGURE 8 embodiment is identical to the FIGURE 5 embodiment. In addition to providing less frictional contact between rope and support stand, center guide 72 positively maintains each rope in its correct position and precludes any possibility of either rope shifting transversely prior to installation of the second rope.

Although three embodiments of the invention have been illustrated and described, it should be understood that the invention is not limited to the precise structure illustrated. It is contemplated for example that the fundamental concepts can be applied to arrangements in which the wire ropes extend upwardly rather than downwardly from the support structure as shown for example in Patent 2,842,257. Likewise, the tie off structures 15, 18 and 19, 20 are merely exemplary and any other suitable structure, such as roof jacks installed at angle, may be utilized.

Accordingly, the scope of the invention should only be limited by the scope of the following appended claims when constituted in light of the pertinent prior art.

I claim:

1. An anchor point for supporting a rope sideframe conveyor and limiting endwise movement of the rope sideframes at a location intermediate the ends of the conveyor comprising:
   a base;
   a pair of horizontally spaced vertical posts extending generally vertically upwardly from and adapted to be disposed on each side of the conveyor;
   means supported by each post for holding oppositely extending ropes in alignment with one another and with the respective end portions thereof anchored in criss-crossing, overlapping relation across the post.

2. Structure for maintaining a pair of meeting tensioned rope sideframes in axial alignment with one another, said structure including, in combination,
   first means for axially displacing the end portion of a first rope sideframe from a reference axis which is coincident with the longitudinal axis of the rope, and
   second means for axially displacing the end portion of a second rope sideframe from the reference axis,
   said first and second axial displacement means being spaced from one another along the reference axis whereby the points of departure of the rope sideframes from the reference axis are spaced from one another,
   said points of departure coinciding with the reference axis.

3. The structure of claim 2 further characterized by and including means for diverting the end portions of the rope sideframes into non-coincident planes.

4. The structure of claim 3 further characterized,
   firstly, in that the first and second axial displacement means include a pair of direction changing members, each member having a bearing surface so placed as to align the rope sideframes with the reference axis when each sideframe bears against its associated bearing surface, and
   secondly, in that the diverting means comprises at least one diverting member carried by one of the direction changing members,
   said diverting member having a bearing surface which is angularly disposed with respect to the bearing surface on the direction changing members.

5. The structure of claim 3 further characterized,
   firstly, in that the first and second axial displacement means include a pair of direction changing members, each member having a bearing surface so placed as to align the rope sideframes with the reference axis when each sideframe bears against its associated bearing surface, and
   secondly, in that the diverting means comprises at least a pair of diverting members, each diverting member being associated with a direction changing member,
   each of said diverting members having a bearing surface which is angularly disposed with respect to the bearing surface on the direction changing members.

6. Structure for maintaining a pair of tensioned rope sideframes in axial alignment with one another, said structure including, in combination,
   a substantially rigid generally vertically oriented frame member,
   a pair of shoes carried by the frame member and positioned transversely to the reference axis of a pair of opposed, meeting rope sideframes,
   each shoe having a guide,
   one guide having an inner guide surface and the other guide having an outer guide surface,
   each of the shoes having an upper bearing surface, the bearing surfaces of the shoes lying in the same horizontal plane,
   said shoes being spaced from one another horizontally a distance sufficient to enable a rope passing over and bending around the other shoe to clear the opposite shoe,
   said inner and outer generally vertical guide surfaces extending above and below the bearing surfaces on the shoes to thereby prevent transverse movement of the rope sideframes.

7. Structure for maintaining a pair of tensioned rope sideframes in axial alignment with one another along a reference axis, said structure including, in combination,
   a generally vertically upwardly extending main frame member,
   a shoe having an upper bearing surface carried by the main frame member,
   a pair of guides extending generally vertically upwardly from the bearing surface of the shoe,
   said vertical guides having inner guide surfaces slightly angled with respect to the reference axis,
   the inclination of the vertical guides being such that one end of the inner rope contacting surface of the vertical guide is offset from a line parallel to the reference axis a distance substantially equal to the diameter of a rope sideframe,
   said vertical guide members being spaced apart a width at least twice the width of the rope sideframes whereby both of said rope sideframes may lie side by side between the inner vertical guide members.

8. An anchor point for supporting a rope sideframe conveyor and maintaining the meeting ends of a pair of rope sideframes in axial alignment with one another, said anchor point comprising:
   a base;
   a pair of horizontally spaced vertical posts adapted to be disposed on each side of the conveyor, said posts extending generally vertically upwardly from the base,
a pair of rope training shoes supported by each post,
a rope guide supported by each shoe, each pair of rope guides being horizontally spaced from one another and in a vertical plane which is spaced outwardly from the post;
each pair of rope training shoes being located at the same level,
at least one of said guides on each post having an inner vertical guide surfaces above the respective shoes effective to limit inward shifting of a rope trained across the shoe corresponding to the said one guide;
said one guide having an inner vertical guide surface at a level below the shoes effective to limit outward shifting of a rope trained across the shoe corresponding to said other guide;
each of said posts being effective to limit inward shifting of a rope trained across said shoe corresponding to said other guide.

9. An anchor point for supporting a rope sideframe conveyor and maintaining the meeting ends of a pair of rope sideframes in axial alignment with one another, said anchor point comprising:
a base;
a pair of horizontally spaced vertical posts adapted to be disposed on each side of the conveyor, said posts extending generally vertically upwardly from the base,
a pair of rope training shoes supported by each post,
a rope guide supported by each shoe, each pair of rope guides being horizontally spaced from one another and in a vertical plane which is spaced outwardly from the post;
each pair of rope training shoes being located at the same level,
one of said guides having an inner vertical guide surface above its associated shoe effective to limit outward shifting of a first rope trained over said last named shoe;
the other of said guides having an outer vertical guide surface at a level below the shoes effective to limit inward shifting of a rope trained across the shoe corresponding to the said one guide;
said one guide having an inner vertical guide surface at a level below the shoes effective to limit outward shifting of a second rope trained across the shoe associated with said other guide in criss-crossing, overlapping relation with said first rope,
each of said posts being effective to limit inward shifting of a rope trained across shoe corresponding to said other guide.

References Cited by the Examiner
UNITED STATES PATENTS 1,875,139 8/32 Pounder _____ 24—123
2,842,257 7/58 Craggs _____ 198—139

SAMUEL F. COLEMAN, *Primary Examiner.*
WILLIAM B. LA BORDE, ERNEST A. FALLER,
*Examiners.*